United States Patent Office 3,306,030
Patented Feb. 28, 1967

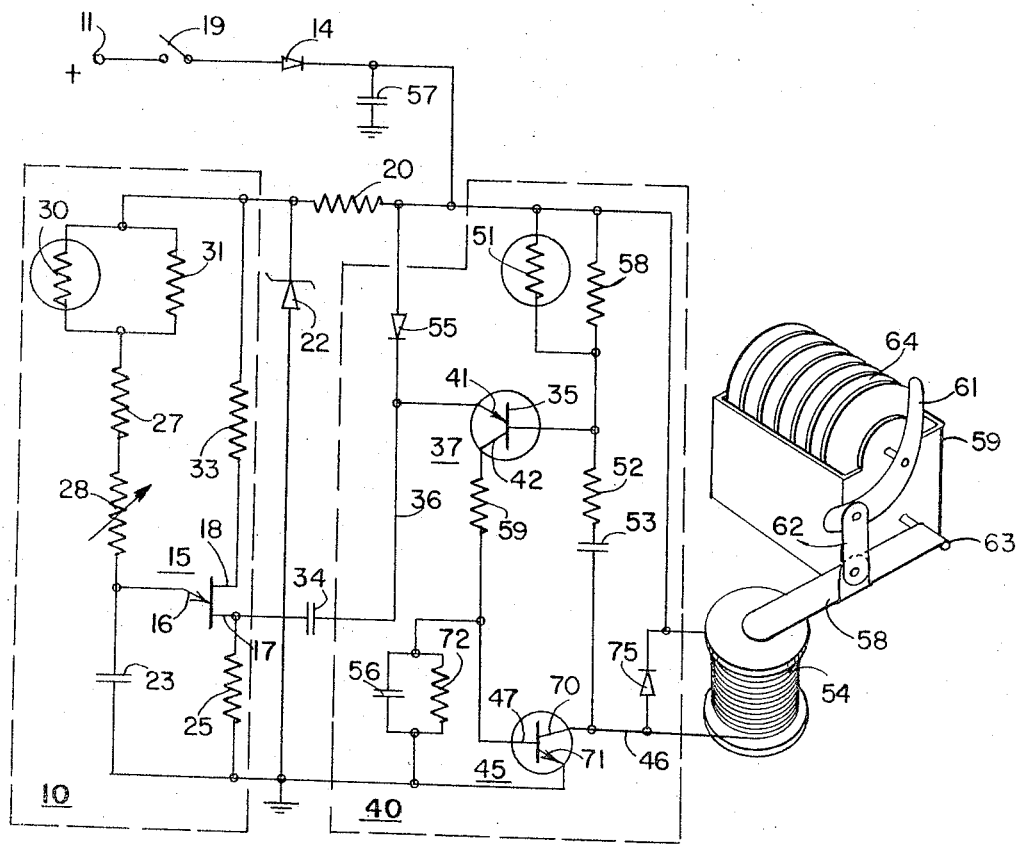

3,306,030
ELECTRONIC TIME REGISTERING DEVICE
Daryl D. Wiley, Elmhurst, Ill., assignor to Motorola, Inc., Franklin Park, Ill., a corporation of Illinois
Filed Nov. 25, 1964, Ser. No. 413,889
3 Claims. (Cl. 58—145)

This invention pertains to an electronic time indicating device and more particularly to an electronic elapse time meter for registering the hours of operation of intermittently operated devices.

A time lapse meter is desirable in many applications to provide an accurate record of the number of hours that certain types of equiment, such as internal combustion engines, have run. This is particularly true in those applications where heavy duty engines are involved, and where preventive maintenance practices require that these engines be overhauled upon completion of a scheduled number of operating hours.

Conventional electric-wind clock time meters have the disadvantage that they require a large number of moving parts which wear to limit the life thereof. Further, there is a problem of automatic starting and stopping with an attending loss of time. Mechanical time devices are also adversely affected by vibration and shock.

It is, therefore, an object of this invention to provide an accurate and improved electronic elapsed time meter for registering the hours of operation of intermittently operated devices.

It is another object of this invention to provide an electronic elapsed time meter which requires no starting or stopping time and is substantially immune from vibration and shock thereby providing a high degree of accuracy.

It is still another object of this invention to provide an electronic elapsed time meter which requires few moving parts thereby increasing its useful life over the conventional electric-wind clock time meters.

One feature of the invention is the provision of an electronic elapsed time meter utilizing solid state devices, and including a relaxation oscillator having a unijunction transistor which applies regularly timed pulses to a transistor amplifier which drives a mechanical counter. The oscillator has time base means to periodically turn on the unijunction transistor, which include a capacitor, a variable resistor, and a thermistor, with the thermistor acting to compensate for thermal variation of the capacitor. A zener diode is used to provide a regulated voltage to the unijunction transistor.

Another feature of the invention is the provision of an electronic elapsed time meter having a unijunction transistor relaxation oscillator coupled to a two-stage transistor control amplifier, with a capacitor coupling the input circuit of the amplifier to the oscillator, and a capacitor coupling the second stage of the amplifier to the first stage thereof to provide positive feedback.

Still another feature of the invention is the provision of a time elapsed meter including an oscillator providing timed pulses to an amplifier which drives an electric solenoid and mechanical counter. The solenoid acts through mechanical elements to record on the counter the number of cycles of the relaxation oscillator to give an indication of the elapsed time.

The invention is illustrated in the single figure of the drawing which is a schematic diagram showing the time elapsed meter circuit and the coupling thereof to the mechanical counter.

In practicing this invention there is provided a transistorized elapsed time circuit which drives a mechanical counter. The circuit, which is energized or de-energized when the device to be timed is started or stopped, includes a relaxation oscillator having a unijunction transistor with a zener diode coupled to the transistor to regulate the supply voltage. A variable resistor and a capacitor conjunctively establish a time base to periodically turn on the unijunction transistor. A thermistor is included in the circuit to compensate for the thermal variation of the capacitor. Coupled to the oscillator through a capacitor is the input to a two stage transistor control amplifier. A second capacitor couples the second stage of the amplifier to the first stage thereof to provide positive feedback, which acts to insure that the amplifier will not cease conducting until the solenoid coupled to the output circuit of the amplifier has been energized. The solenoid, coupled to the output circuit of the control amplifier and actuated by it, operates the counter through a mechanical linkage so that it counts and records the cyclic pulses of the relaxation oscillator to give an indication of the elapsed time during which the device has operated.

Referring now to the drawing, the meter circuit includes a relaxation oscillator 10 coupled to a power supply 11, having a filter capacitor 57 and diode 14 which protects the system from improper polarity at the time the power supply is connected to the system. The power supply can be, for example, the 12 volt electrical system for an internal combustion engine. The system is energized when ignition switch 19 is closed to start the engine, and is de-energized when the switch 19 is opened to stop the engine. Relaxation oscillator 10 has a unijunction transistor 15 which has an emitter 16, base I 17 and base II 18. Resistor 20 and zener diode 22 are coupled across the energizing voltage, to apply a regulated supply voltage to transistor 15.

The oscillator 10 operates to provide a recurring pulse wave. When the system is energized upon starting the engine, capacitor 23 is charged through resistors 27 and 28 and the parallel combination of thermistor 30 and resistor 31. The voltage rises on capacitor 23 until it reaches a predetermined level at which time the unijunction transistor 15 conducts to discharge capacitor 23 through resistor 25 in series with the base I 17 of the transistor 15. Resistor 27, variable resistor 28, thermistor 30, resistor 31 and the capacitor 23 establish a time base circuit to periodically turn on transistor 15. Thermistor 30 in parallel with resistor 31 operates to increase or decrease the resistance in series with resistor 27 and variable resistor 28 to compensate for the thermal variation of capacitor 23. The values of these components can be selected to provide a desired period of conduction. In one application the values are selected to cause transistor 15 to conduct every 3.6 seconds. It should be understood, however, that the period required to charge the capacitor 23 to a level to turn on transistor 15 may be changed as necessary by adjusting variable resistor 28, or by changing the values of the other components forming the oscillator 10. The resistor 33 connected in series to the base II 18 of transistor 15 determines the firing voltage of the transistor 15.

Relaxation oscillator 10 is coupled to the input circuit 36 of the two stage transistor control amplifier 40 through capacitor 34. The circuit 36 is connected to the emitter 41 of the PNP type transistor 37. Transistor 37 constitutes the first stage of amplifier 40 and transistor 45 of the PNP type constitutes the second stage. Diode 55 and resistor 58 couple the power supply to the emitter 41 and base 35 respectively to provide bias for transistor 37. Thermistor 51 is coupled across resistor 58 to the base 35 to provide temperature stability for transistor 37. Collector 42 of transistor 37 is connected to the base 47 of transistor 45 through resistor 59. The collector 70 of transistor 45 is connected through solenoid winding 54 to the direct current power supply, and the emitter 71 thereof is connected to ground. Capacitor 56 cooperates with resistor 72 to form a filter to attenuate transients formed by changing potentials in the circuit.

In operation, when unijunction transistor 15 conducts, the potential will rise at the emitter 41 of transistor 37 forward biasing transistor 37 into conduction. The conduction of transistor 37 causes current flow through resistor 59 thereby raising the potential at the base 47 and forward biasing transistor 45 into conduction. This results in current flow through the collector 70 to energize solenoid 54, which is coupled to the output circuit 46 of amplifier 40. A positive feedback network consisting of capacitor 53 and resistor 52 coupled between the collector 70 of transistor 45 and the base 35 of transistor 37 maintains the potential at the base 35 at a level lower than the potential on emitter 41 to insure that the amplifier 40 will conduct for sufficient period to energize the solenoid 54. A diode 75 is coupled across the solenoid 54 to suppress conductive transient currents from transistor 45.

As previously stated, conduction of amplifier 40 excites solenoid 54. Solenoid 54 actuates counter 59, which may be any counter adapted to count oscillating motion, as for example, the Veeder-Root Minicounter 1779 series. The excited solenoid winding 54 attracts lever 58 pivotally mounted to support 63, thereby imparting motion through linkage 62 to spring loaded arm 61 which advances the first of seven counter wheels 64 of the counter 59 one number. When solenoid 54 is de-energized, the spring then returns the arm 61 to the ready position lifting lever 58 to break contact with solenoid 54.

The counter 59 records the hours of operation of the device to be timed. As has been stated, unijunction transistor 15 may conduct every 3.6 seconds. This renders the control amplifier 40 conducting which excites the solenoid as described. Each pulse through the solenoid moves the first counter wheel of the counter wheels 64 (the 1/1000 hour wheel) up one number. Ten pulses or one rotation of the first counter wheel which will be 36 seconds or 1/100 of an hour will turn the second wheel of the counter wheels 64 (the 1/100 hour wheel) up one number. The operation will continue up to 9,999.999 hours on the Veeder-Root Minicounter or to the limit of any other suitable counter that may be used.

The invention as described is an accurate and improved electronic time elapse meter. The timing mechanism is all solid state circuitry. Therefore, there are no moving parts to be subject to vibration and shock, and there is no delay time in starting and stopping the time mechanism which will record 1/1000 of an hour exactly 3.6 seconds after the device is splaced in operation. Its useful life is extended over that of the conventional electric-wind mechanical clock timers because the life of the electronic timer is essentially dependent on the pivot pin which connects the lever from the solenoid to the counter arm, since the timing mechanism itself is constructed entirely of solid state circuitry with a known long life span.

I claim:

1. An electronic elapsed time meter for registering the hours of operation of a device, including in combination, a relaxation oscillator having a unijunction transistor, means including a zener diode coupled to said transistor to apply a regulated voltage thereto, said oscillator including time base means for periodically turning on said unijunction transistor including a capacitor, a variable resistor and a thermistor, said thermistor acting to compensate for thermal variation of said capacitor, a transistor control amplifier having first and second stages and input and output circuits, means coupling said oscillator to said input circuit of said amplifier, said control amplifier including capacitor means coupling said second stage of said amplifier to said first stage thereof to provide positive feedback, said control amplifier being rendered conducting by periodic pulses applied thereto by said unijunction transistor, and counter means including an actuating electric solenoid coupled to said output circuit of said amplifier, said counter means including counter wheels actuated by excitation of said solenoid during said periodic conduction of said control amplifier to register the number of periods of conduction of said relaxation oscillator.

2. An electronic elapsed time meter for registering the hours of operation of a device, including in combination, a relaxation oscillator having a unijunction transistor, means including a zener diode coupled to said transistor to apply a regulated voltage thereto, said oscillator including time base means for periodically turning on said unijunction transistor including a capacitor, a variable resistor and a thermistor, said thermistor acting to compensate for thermal variation of said capacitor, a transistor control amplifier having first and second stages and input and output circuits, means including a first capacitor coupling said oscillator to said input circuit of said amplifier, said amplifier means including a thermistor and a diode to respectively temperature stabilize and bias said first stage thereof, and feedback means including a second capacitor coupling said second stage of said amplifier to said first stage thereof to provide positive feedback, said control amplifier being rendered conducting by periodic pulses applied thereto by said unijunction transistor and counter means including an actuating electric solenoid and a diode across said solenoid to suppress transient currents coupled to said output circuit of said amplifier, said counter means including counter wheels actuated by excitation of said solenoid during said periodic conduction of said control amplifier to register the number of periods of conduction of said relaxation oscillator.

3. An electronic elapsed time meter for registering the hours of operation of a device that is operated at regular intervals, including in combination, a relaxation oscillator having a unijunction transistor, means including a zener diode coupled to said uijunction transistor to apply a regulated voltage thereto, said oscillator including time base means including a resistor-capacitor network for periodically turning on said unijunction transistor at regular time intervals to provide periodic pulses, switch means responsive to the starting of each interval of operation of the device for energizing said oscillator during the entire interval of operation, a transistor control amplifier having first and second transistors and input and output circuits, means coupling said oscillator to said input circuit of said amplifier, said control amplifier being rendered conducting by periodic pulses applied thereto by said unijunction transistor, and counter means including an actuating electric solenoid coupled to said output circuit of said amplifier, said counter means including counter wheels actuated by said solenoid, said control amplifier including capacitor means coupling said second transistor of said amplifier to said first transistor thereof to provide positive feedback to increase the current supplied by said output circuit to said solenoid during conduction of said control amplifier in response to said periodic pulses from said unijunction transistor, to thereby register the number of periods of conduction of said relaxation oscillator, and the total elapsed hours of operation of the device.

(References on following page)

References Cited by the Examiner

UNITED STATES PATENTS

| | | | |
|---|---|---|---|
| 2,968,770 | 1/1961 | Sylvan | 331—111 |
| 2,976,470 | 3/1961 | Krassoievitch et al. | 318—341 |
| 2,988,708 | 6/1961 | Schmidt | 331—111 |
| 2,995,690 | 8/1961 | Lemon | 318—138 |
| 3,001,114 | 9/1961 | Hermann et al. | 318—16 |
| 3,018,419 | 1/1962 | Bonn | 317—148.5 |
| 3,047,224 | 7/1962 | Ray et al. | 235—92 |
| 3,047,789 | 7/1962 | Lowry | 331—111 |
| 3,074,028 | 1/1963 | Mammano | 331—111 |
| 3,149,293 | 9/1964 | Farkas | 332—15 |
| 3,229,225 | 1/1966 | Schimpf | 331—111 |

RICHARD B. WILKINSON, *Primary Examiner.*

G. F. BAKER, *Assistant Examiner.*